(12) United States Patent
Song et al.

(10) Patent No.: US 11,203,855 B2
(45) Date of Patent: Dec. 21, 2021

(54) UNIVERSAL WATER FOUNTAIN FILTER HEAD

(71) Applicant: Louisville Water Company, Louisville, KY (US)

(72) Inventors: Rengao Song, Louisville, KY (US); Mark Campbell, Louisville, KY (US); Vince Monks, Louisville, KY (US)

(73) Assignee: LOUISVILLE WATER COMPANY, Louisville, KY (US)

( * ) Notice: Subject to any disclaimer, the term of this patent is extended or adjusted under 35 U.S.C. 154(b) by 0 days.

(21) Appl. No.: 15/973,251

(22) Filed: May 7, 2018

(65) Prior Publication Data

US 2018/0320343 A1 Nov. 8, 2018

Related U.S. Application Data

(60) Provisional application No. 62/501,941, filed on May 5, 2017.

(51) Int. Cl.
*E03B 9/20* (2006.01)
*B01D 15/00* (2006.01)
(Continued)

(52) U.S. Cl.
CPC .............. *E03B 9/20* (2013.01); *B01D 15/00* (2013.01); *B01D 29/33* (2013.01); *B01D 35/04* (2013.01);
(Continued)

(58) Field of Classification Search
CPC ........... E03B 9/20; B01D 35/04; B01D 29/33; B01D 15/00; B01D 2201/304;
(Continued)

(56) References Cited

U.S. PATENT DOCUMENTS

2001/0040120 A1* 11/2001 Jousset .................. B01D 29/15
    210/85
2003/0070968 A1* 4/2003 Haynes .................. B01D 35/31
    210/87
(Continued)

FOREIGN PATENT DOCUMENTS

| CN | 102032391 A | 4/2011 |
|---|---|---|
| CN | 204004552 U | 12/2014 |
| EP | 3618940 A1 | 3/2020 |

OTHER PUBLICATIONS

International Search Report and Written Opinion issued in Application No. PCT/US2018/031424 dated Jul. 13, 2018.
(Continued)

*Primary Examiner* — Madeline Gonzalez
(74) *Attorney, Agent, or Firm* — Middleton Reutlinger; Alexander P. Brackett

(57) ABSTRACT

The embodiments described herein include an apparatus for adapting an existing water fountain having a water supply line and an existing bubbler assembly for dispensing water to a filtered water fountain. The system includes an adapter base in fluid communication with the water supply line, a housing assembly secured to the adapter base, and a bubbler head assembly secured to the housing assembly for dispensing water. A filter cartridge assembly is disposed within the housing assembly and is in fluid communication with the adapter base and the bubbler head assembly.

15 Claims, 5 Drawing Sheets

(51) Int. Cl.
    *C02F 1/28*     (2006.01)
    *B01D 35/04*     (2006.01)
    *C02F 1/00*     (2006.01)
    *B01D 29/33*     (2006.01)
    *C02F 101/12*     (2006.01)
    *C02F 101/10*     (2006.01)
    *C02F 101/38*     (2006.01)
    *C02F 101/36*     (2006.01)
    *C02F 101/20*     (2006.01)
    *C02F 1/44*     (2006.01)

(52) U.S. Cl.
    CPC ........ *C02F 1/003* (2013.01); *B01D 2201/304* (2013.01); *C02F 1/281* (2013.01); *C02F 1/283* (2013.01); *C02F 1/44* (2013.01); *C02F 2101/103* (2013.01); *C02F 2101/12* (2013.01); *C02F 2101/20* (2013.01); *C02F 2101/36* (2013.01); *C02F 2101/38* (2013.01); *C02F 2201/006* (2013.01); *C02F 2307/06* (2013.01); *C02F 2307/10* (2013.01)

(58) Field of Classification Search
    CPC ........ B01D 25/00; B01D 27/00; B01D 29/00; B01D 35/30; B01D 2201/40; B01D 2201/4023; B01D 35/027; B01D 2201/291; B01D 2201/301; B01D 2201/34; C02F 1/003; C02F 2201/006; C02F 1/44; C02F 1/281; C02F 2307/10; C02F 2101/20; C02F 2101/38; C02F 2101/103; C02F 2307/06; C02F 2101/12; C02F 1/283; C02F 2101/36
    USPC ....... 210/348, 449, 282, 441, 442, 444, 447, 210/453, 455, 493.2
    See application file for complete search history.

(56) References Cited

U.S. PATENT DOCUMENTS

| | | | |
|---|---|---|---|
| 2005/0000867 A1* | 1/2005 | Haynes | B01D 35/143 210/87 |
| 2005/0092661 A1 | 5/2005 | Warrent et al. | |
| 2006/0213827 A1* | 9/2006 | Nozaki | B01D 27/08 210/437 |

OTHER PUBLICATIONS

International Preliminary Report on Patentability of PCT Ser. No. PCT/US2018/031424 dated Nov. 14, 2019.

European Patent Office; Communication issued in Application No. 18726683.8, dated Dec. 3, 2020.

* cited by examiner

UNIVERSAL WATER FOUNTAIN FILTER HEAD

BACKGROUND OF THE INVENTION

Field of the Invention

This specification generally discloses and describes a water filtration system and more particularly discloses a water fountain filtration system that utilizes a universal filter head or housing to adapt existing water fountain systems to filtered water systems with minimal effort and expense.

Description of the Related Art

In many public and private facilities, both indoor and outdoor, water fountains are an important and necessary accessory to accommodate public health and safety. These fountains are located in a wide variety of areas: parks, restrooms, federal, state and local buildings, and of course school buildings and playgrounds. In a typical installation, the fountain comprises a simple bubbler connected to a water supply for supplying water and a hand or foot operated mechanism for opening a water valve to supply the water to the consumer.

Most of these systems are utterly devoid of any filtration system. In most areas of the United States drinking unfiltered potable water is relatively safe. However, in some water systems, and in certain areas, high levels of various contaminants may be present in the drinking water, including but not limited to unacceptably high levels of chlorine and lead. In many areas facilities such as schools and daycares express concern over lead contamination in particular since lead exposure can lead to many developmental issues in growing children.

In fact, some tests have shown that old infrastructure (which often includes sections of lead pipe) can lead to various contaminants leaching into the water supply. Some fountains include factory filtration systems, but the majority of existing fountains do not. Furthermore, available filtration systems for existing fountains tend to be quite costly, and thus do not provide good solutions for facilities that have a large number of fountains to address.

Accordingly, there is a need in the art for a water filtration system that may be readily and inexpensively employed in existing water fountains that provides filtration for certain targeted contaminants in the water. Furthermore, there is a need in the art for a relatively simple and inexpensive system that is easily retrofitted to existing fountain systems.

Other features, objects and advantages of the various embodiments disclosed herein will become apparent from the detailed description of the embodiments of the invention taken in conjunction with the appended drawing Figures.

SUMMARY OF THE INVENTION

In some aspects this specification describes a turnkey system and apparatus for water filtration that may be advantageously mounted to existing water fountains and the like. The invention is capable of replacing existing water fountain bubblers by mounting in the same approximate location on the fountain. The apparatus and system provided herein also provides an economical method to provide effective filtration to large public water fountain installations, such as those provided by municipalities and schools, with minimum expense and labor.

In various aspects the filtration apparatus includes a housing that includes a bubbler head assembly and a spout for delivery of water to a user. The housing assembly provides an aperture that is connected to a supply water line or the equivalent at a bottom end thereof. The housing assembly in various embodiments houses a filter cartridge having filter media therein through which supply water is routed to effect filtration. The filter cartridge may be held within the housing assembly by a lower end cap that engages a bubbler assembly for delivery of water to a spout, and a pressure cap for sealing the apparatus.

In various aspects and embodiments the pressure cap is shaped to engage the filter cartridge and hold it in place, while being easily removable for quick replacement of the filter cartridge when necessary. In further embodiments the filter cartridge is shaped to provide a water channel between the housing assembly and cartridge, to direct water flow through a maximum surface area of the filtration media. In yet further embodiments the pressure cap and end cap are secured to and form an integral part of the filter cartridge such that all elements may be replaced as a unit when necessary.

Additionally, in one aspect there is provided a filtration system that is disposed in the water supply stream that is at the point of consumption so that contaminants are eliminated from the water supply at the last possible point prior to consumption.

As used herein for purposes of the present disclosure, the term "water fountain" refers generally to describe any water delivery system that provides a supply of water to an end user. Exemplary water fountains suitable for use in conjunction with the system described herein include but are not limited to water fountains having a source of water, a bubbler head through which the water is delivered, and a water supply valve for turning the water on and off. Of course a wide variety of different water fountains may be employed in the environment of the invention without departing from the scope thereof.

Furthermore, as used herein the term "filtration media" or "filter media" refers to any type of water filtration mechanism that may be employed to reduce or eliminate a targeted contaminant or contaminants therein. Exemplary filtration media suitable for use in the present invention include but are not limited to activated carbon of all types, powdered activated carbon, anthracite, activated alumina, birm, calcite, filter sand, garnet, magnesium oxide, manganese dioxide, copper/zinc granules, zeolite, hollow fiber filter membranes and multi-media layered filters of all types. A wide variety of different media utilized either alone or in combination may be employed in the system of the invention without departing from the scope thereof.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other advantages and features, which characterize the embodiments, are set forth in the claims appended hereto and form a further part thereof. However, for a better understanding of the embodiments and of the advantages and objectives attained through their use, reference should be made to the Drawing Figures and to the accompanying specification, in which there are described exemplary embodiments. This summary is merely provided to introduce a selection of concepts that are further described below in the detailed description, and is not intended to identify key or essential features of the claimed subject matter, nor is it intended to be used in limiting the scope of the claimed subject matter.

BRIEF DESCRIPTION OF THE DRAWING FIGURES

In the drawings, like reference characters generally refer to the same parts throughout the different views. Also, the drawings are not necessarily to scale, emphasis instead generally being placed upon illustrating the principles of the invention.

DETAILED DESCRIPTION OF THE PREFERRED EMBODIMENT(S)

Figure 1:
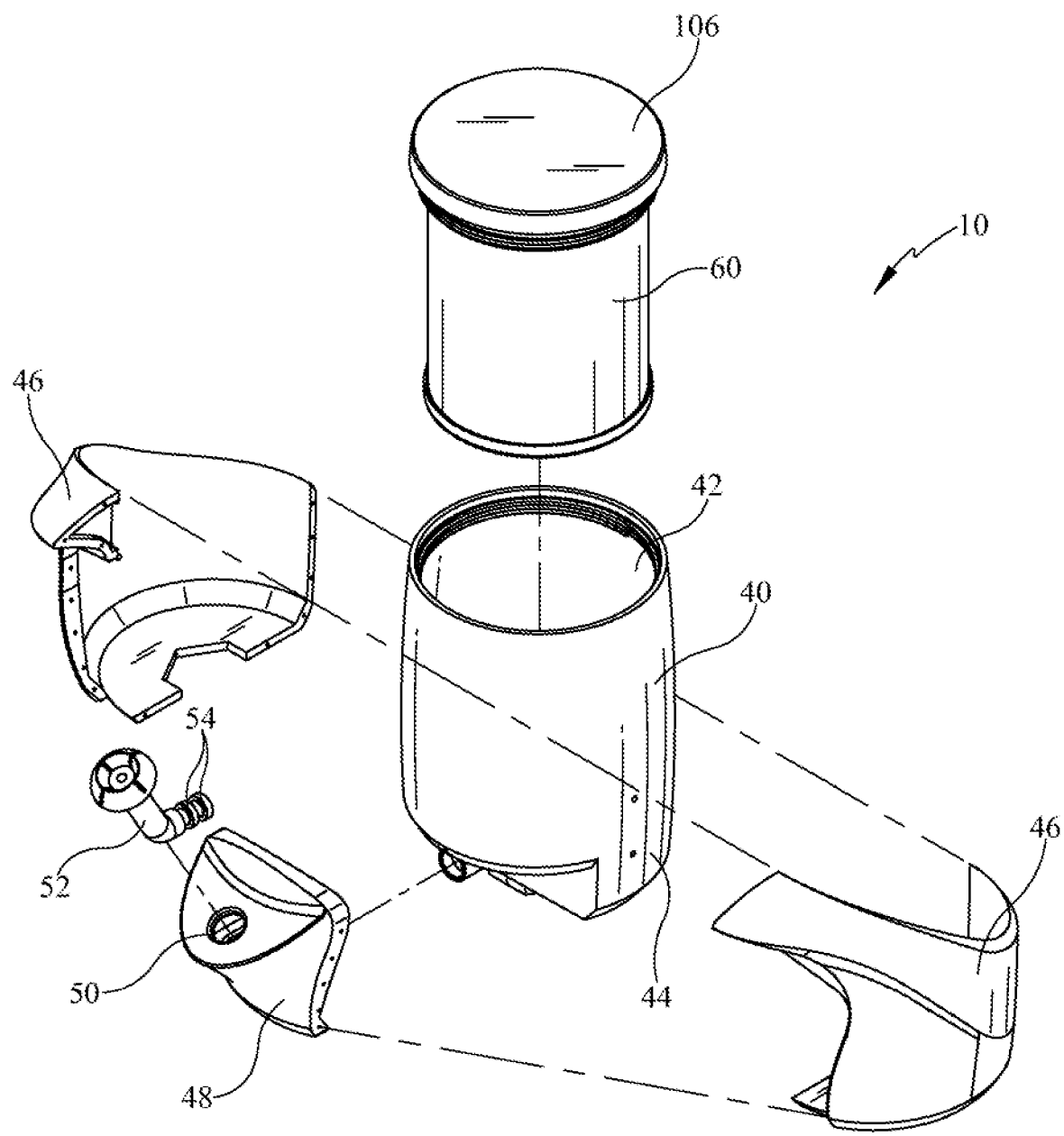
FIG. 1 is an exploded isometric view of a universal water filtration apparatus in accordance with various aspects and embodiments.

Numerous variations and modifications will be apparent to one of ordinary skill in the art, as will become apparent from the description below. Therefore, the invention is not limited to the specific implementations discussed herein.

The embodiments discussed herein will focus on the implementation of the described techniques and apparatuses for a filtration apparatus and system for a bubbler for existing water fountains. While the embodiments described herein will refer generally to implementation within a water fountain or the equivalent having a conventional bubbler for supplying water, one of ordinary skill will recognize that the invention may be practiced with a broad water supply systems without departing from the scope thereof.

Referring now to drawing FIGS. 1-5, and in accordance with various aspects and embodiments of the invention, the present invention overcomes the aforementioned difficulties in the prior art by providing a filtration apparatus 10 for effecting filtration to an existing water fountain 1 that is equipped with a water supply line 2 and conventional bubbler head 3. Apparatus 10 may in some aspects and embodiments include a base 20 having a fluid aperture 22 therein that is in fluid communication with water supply line 2 to provide water to apparatus 10. In various non-limiting embodiments water supply line 2 may be connected to adapter base 20 by any one of many known fitting systems without departing from the scope of the invention. For example compression couplings, threaded couplings, and sweated copper fittings may be employed to connect water supply line 2 to the fluid aperture 22 of the instant invention.

Figure 2:
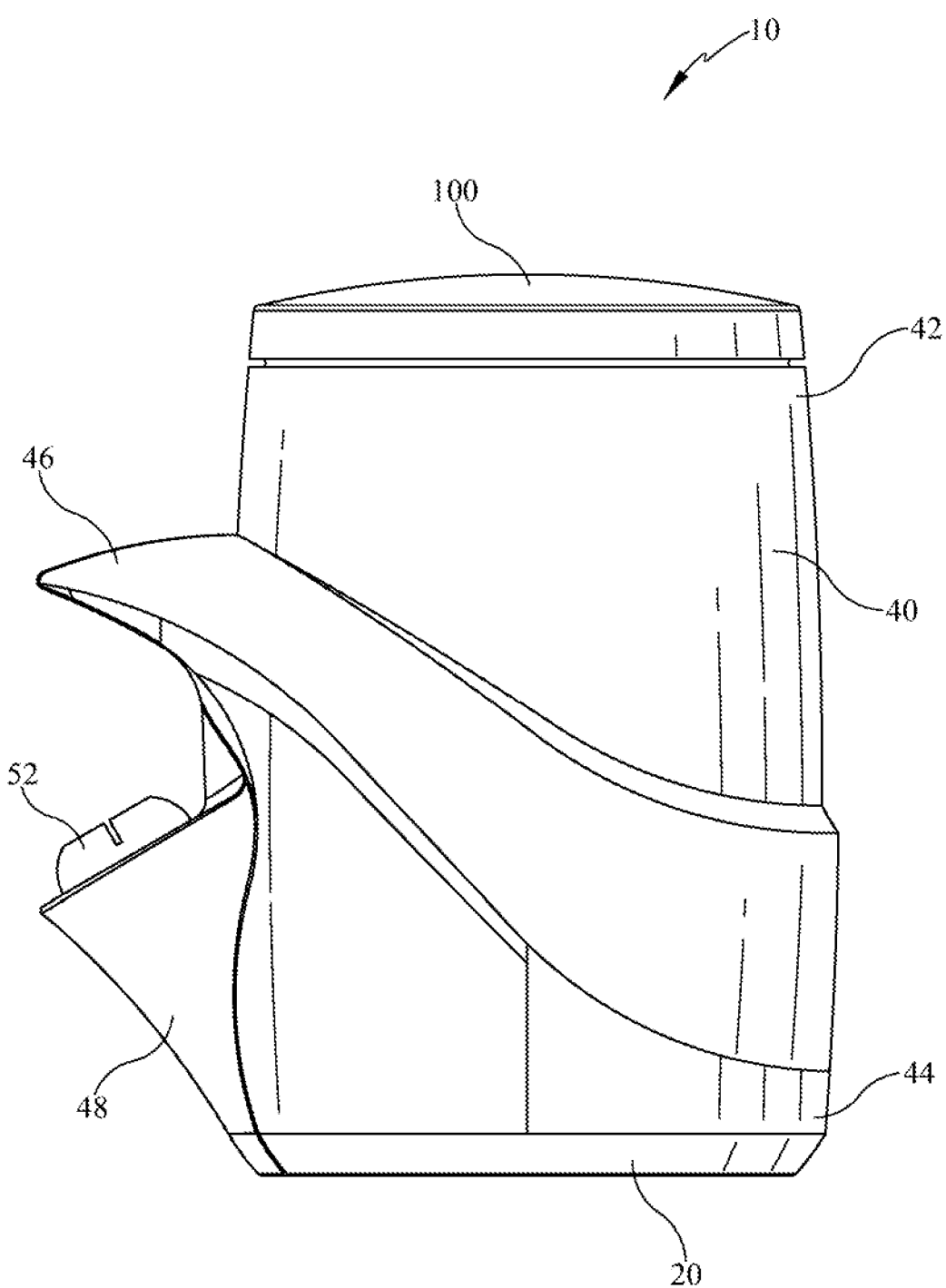
FIG. 2 is an elevation view of a universal water filtration apparatus in accordance with various aspects and embodiments.
Figure 5:
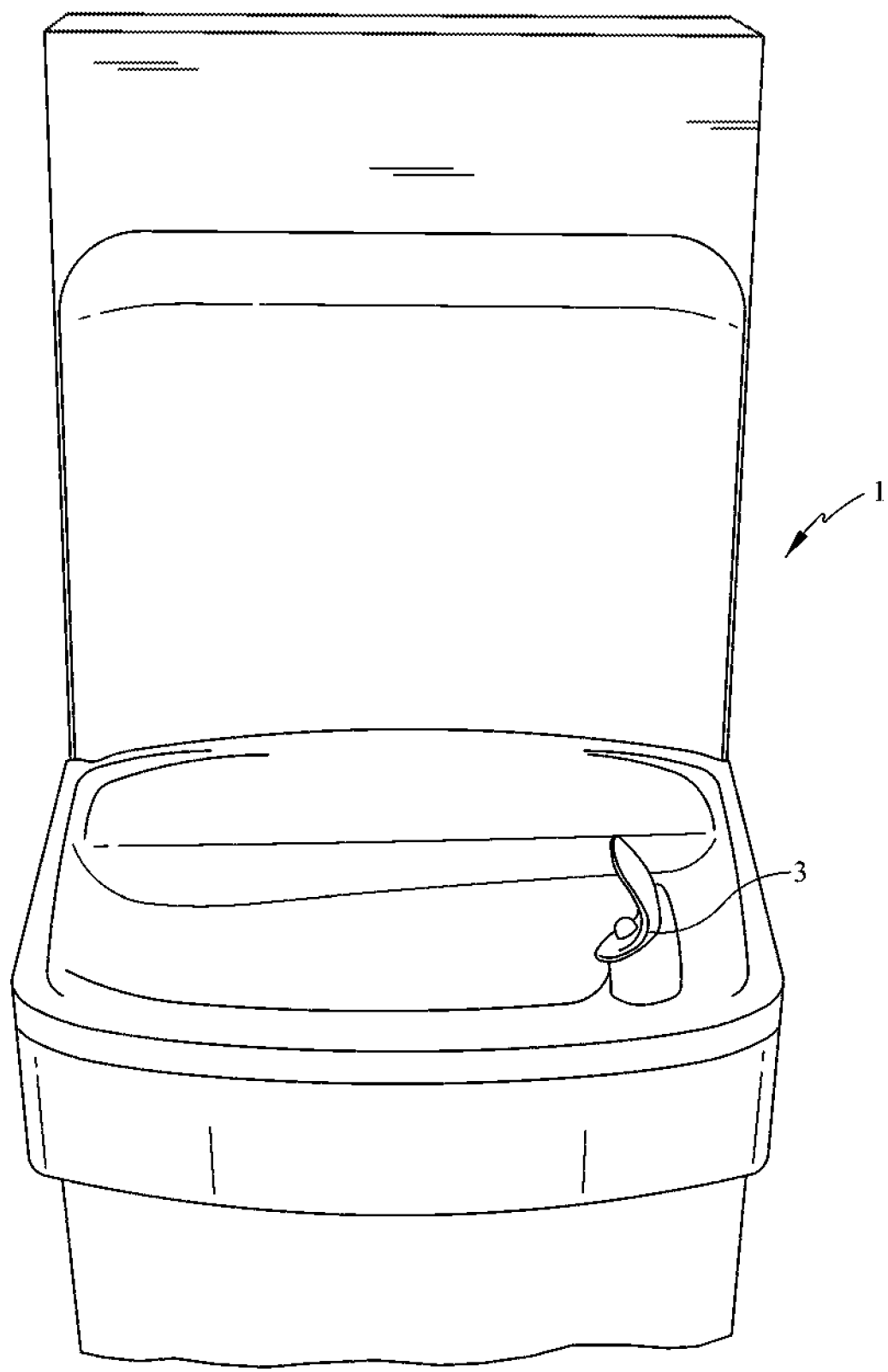
FIG. 5 is a view of a conventional water fountain and filtration apparatus in accordance with various aspects and embodiments.

As best viewed in FIGS. 1 and 2 a housing body assembly 40 having first 42 and second 44 ends is shaped to engage base 20 at second end 44 thereof, such that housing assembly 40 generally occupies the space where an existing bubbler assembly 3, shown in FIG. 5, would be mounted on water fountain 1. In some aspects of the invention, housing body assembly 40 may be generally cylindrical in shape, although a variety of different shaped housings 40 are within the scope of the existing invention. Housing body assembly may in various embodiments include a spout guard 46, depicted as a two-piece assembly 46 that engages body assembly 40, as well as a spout channel 48 having an aperture 50 therein for accepting and stabilizing a spout 52 for dispensing water to a user.

While spout guard 46 is shown herein as a two-piece assembly it should be understood that a multi-piece or unitary spout guard may be provided either separately or integrally with housing body 40 without departing from the scope of the present invention. Spout guard 46 is typically shaped to protect spout 52 from splashes, drips, and even sneezes while the apparatus 10 is in use, and as such is shaped as a cowl over spout 52 in some embodiments. Furthermore, spout channel 48 is shaped to engage and hold spout 52 as it exits apparatus 10 to prevent stress or strain thereto in the case of accidental contact. Spout 52 is provided with at least one o-ring 54, or an equivalent fluid seal 54, that prevents spout 52 from leaking once it is secured to apparatus 10, as discussed further herein below.

In some aspects and embodiments housing body assembly 40 is generally open on first 42 and second 44 ends thereof, to accommodate a filter cartridge assembly 60 therein. In various embodiments, a filter cartridge assembly 60 having a water channel 62 there through is provided to engage or nest within the interior of housing 40. The cartridge assembly 60 is in fluid communication with the base 20 aperture 22.

In some aspects and embodiments cartridge assembly 60 may comprise a filter media 70 therein, through which water must flow, thereby removing a targeted contaminant from the water. As is well known to one of ordinary skill in the art, filter media may comprise a wide variety of known media that are provided to target a known contaminant or contaminants as a particular application may require. For example, where testing indicates the presence of unacceptable levels of lead in the water supply, a filter cartridge 60 may comprise a filter media 70 designed for lead filtration. Of course, filter media 70 may be provided that targets a plurality of contaminants without departing from the scope of the instant invention. Some exemplary but non-limiting targeted contaminants that media 70 may be designed to filter include turbidity, chlorine and chloramines, lead, copper, arsenic, mercury and other heavy metals, atrazine and simazine, and disinfectant byproducts such as haloacetic acids and trihalomethanes. As best depicted in FIGS. 3 and 4, the water flow through filtration apparatus 10 media 70 is shown generally by the arrows in the Figures.

In some aspects and embodiments filter cartridge 60 media 70 may be shaped generally as a cylinder having a central water channel 62 there through along a longitudinal axis thereof. Of course a wide variety of shapes may be used for media 70 without departing from the scope of the invention. In further aspects, media 70 and filter cartridge 60 may be shaped to closely engage housing assembly 40, as will be discussed further herein below.

Apparatus 10 may further comprise a bubbler head assembly 80 secured to housing assembly 40 proximate the second end 44 thereof, that permits water to flow from supply line 1, through adapter base 20, filter cartridge 60, and media 70 to bubbler head assembly 80. Bubbler head assembly 80 may comprise one of many known bubbler head assemblies utilized in known water fountains or water drinking systems. Bubbler head assembly 80 may include a water channel 82 that is in fluid communication with spout 52, which engages channel 82 in a fluid-tight fashion via o-rings 54.

Figure 3:
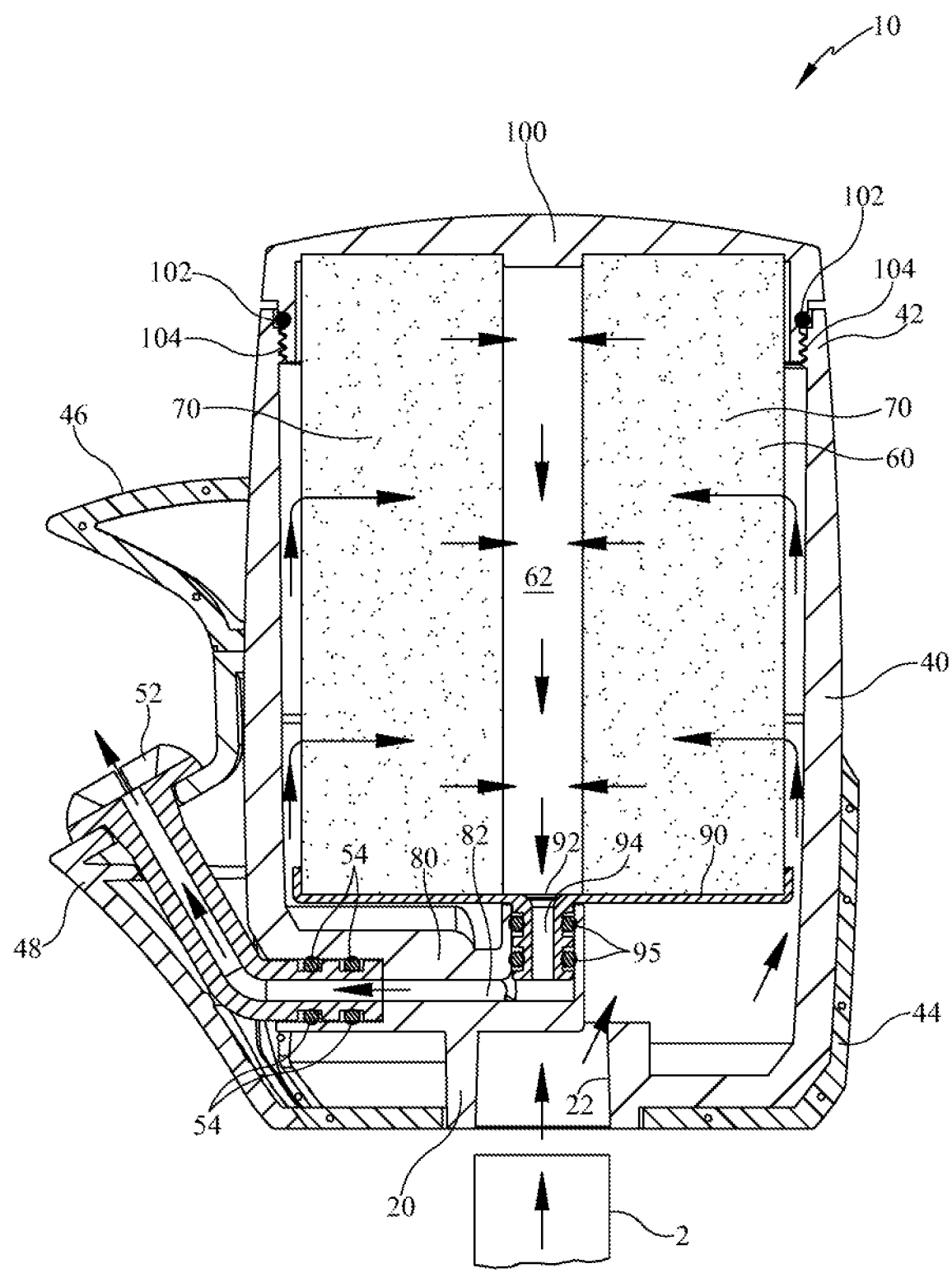
FIG. 3 is a cross-sectional view of a universal water filtration apparatus in accordance with various aspects and embodiments.
Figure 4:
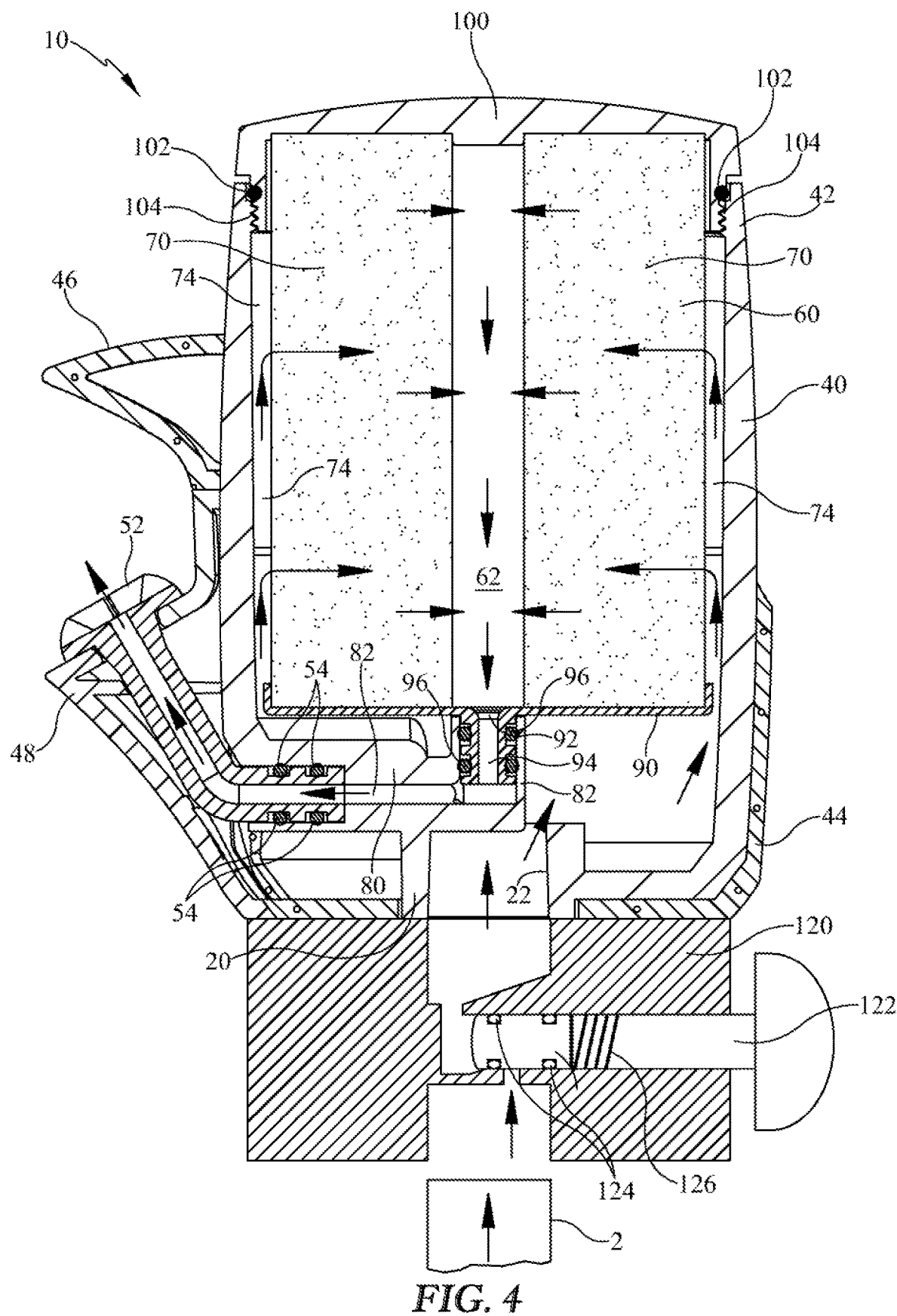
FIG. 4 is a cross-sectional view of a universal water filtration apparatus in accordance with various aspects and embodiments.

In a yet further aspects and embodiments, as seen in FIGS. 1, 3 and 4, an end cap 90 having a central aperture 92 therein may be interposed between filter cartridge 60 and bubbler head assembly 80 to direct fluid flow from filter media 70 into bubbler head 80 at a central point. End cap 90 may be provided in a variety of shapes and sizes to adapt a standard filter cartridge 60 to a plurality of different bubbler head assemblies 80. This feature of the invention provides the ability to manufacture a standard filter cartridge 60 while utilizing various different bubbler heads 80. Furthermore, end cap 90 can be adapted to engage various filter media 70 shapes and configurations in some embodiments of the invention.

In some aspects and embodiments end cap 90 may include a water channel 94 into which aperture 92 opens, and at least one o-ring 96 or an equivalent seal disposed around the outside surface of water channel 94. End cap 90 engages bubbler head assembly 80 such that water channel 94 is in fluid communication with water channel 82, with o-rings 96 providing a seal there between. Thus water flowing through cartridge assembly 60 filter media 70 is directed into bubbler head assembly 80 and spout 52.

In various filtration apparatus 10 further includes a pressure cap 100 that is shaped to engage filter cartridge 60 at an upper portion thereof. Pressure cap 100 may include a seal 102 and a plurality of helical threads on an interior portion thereof that engage a concomitant threads 104 of housing body 40, thereby sealing and capturing cartridge assembly 60 in housing body 40. In yet further aspects and embodiments both end cap 90 and pressure cap 100 may be permanently secured to filter cartridge 60 and media 70, for example by adhesive or press-fitting, such that the end cap 90 and pressure cap 100 form a part of filter cartridge 60. When filter change becomes necessary, the entire cartridge 60 unit is then replaced.

In a yet further embodiment housing body 40, filter cartridge 60, and media 70 are shaped such that a water channel 74 is provided around the exterior surface of filter media 70. In these embodiments water channel 74 is designed to provide water flow through a large surface are of media 70, thereby enhancing and maximizing filter cartridge 60 efficiency and effectiveness. Furthermore, water channel 74 may be designed to provide optimal water flow through filter cartridge 60 by providing consistent and even distribution of water through filter media 70.

As can be readily seen from the above detailed description when cartridge assembly 60 has reached the end of its useful life and needs to be replaced, a user need only turn off the water supply 2, remove the pressure cap, remove the spent cartridge 60 from the bubbler head assembly 80, insert a new cartridge 60, and then replace the pressure cap 100 to seal the filtration apparatus 10. Thus filtration apparatus 10 provides a quick and simple system for changing filter cartridges 60 when replacement is required.

Referring now to FIG. 4, in some aspects and embodiments filtration apparatus 10 may be provided with an integral water valve body 120 that is in fluid communication with water supply 2. Valve body 120 may include a water valve 122, having a plurality of o-ring seals 124 around valve 122. In this exemplary but non-limiting embodiment valve 122 is shown as a simple spring 126 return valve 122 that permits water 2 to flow through valve body 120 into aperture 22 when depressed. It should be recognized that the various embodiments may be practiced and employed with the use of an integral valve body 120 having many different configurations, or with a remote valve (not shown), mounted elsewhere on a water fountain 1 that simply turns water supply 2 flow on and off to filtration apparatus 10.

In further aspects and embodiments apparatus 10 may be sized and shaped to replace an existing bubbler head assembly from a fountain 1, such that a maintenance worker may quickly and readily retrofit water fountains 1 with the apparatus of the instant invention with minimal effort and few required tools. In these embodiments the existing bubbler head can simply be removed from the fountain 2, then filtration apparatus 10 is simply connected to water supply 2 via conventional plumbing connections in the location of the old bubbler head. This aspect of the invention provides the ability for a large number of fountains 1 to be provided with inexpensive filtration at a relatively low costs. As is readily apparent this feature of the invention is particularly advantageous for school systems and other public facilities such as buildings and parks, where a great number of existing fountains may need to be provided with filtration, since it provides a simple and cost-effective system that doesn't require replacement of an entire fountain.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

We claim:

1. An apparatus for adapting an existing water fountain having a water supply, and a water supply line, and an existing bubbler head assembly for dispensing water to a filtered water fountain comprising:
   an adapter base configured to be secured to said existing water fountain in place of said existing bubbler head assembly, wherein said adapter base is in fluid communication with said water supply line;
   a housing assembly having a first end and a second end, wherein the second end thereof is secured to said adapter base;
   a bubbler head assembly having and inlet and an outlet secured to said housing assembly proximate the second end thereof for dispensing water;
   a removable filter media disposed within said housing assembly and in fluid communication with said adapter base at one end thereof and said bubbler head assembly inlet at a second end thereof;
   a pressure cap removably secured to a top portion of said housing assembly, said pressure cap shaped to engage and secure said removable filter media.

2. An apparatus as claimed in claim 1 comprising:
   an end cap in fluid communication with said bubbler head assembly; and
   a filter media cartridge securing said filter media through which water flows to said end cap and then through said bubbler head assembly.

3. The apparatus of claim 2 wherein said end cap comprises an aperture and a water channel in fluid communication with said bubbler head assembly.

4. An apparatus as claimed in claim 1 wherein said filter media is removable and replaceable at predetermined intervals.

5. An apparatus as claimed in claim 2 wherein said filter media cartridge filters at least one targeted contaminant from said water supply.

6. An apparatus as claimed in claim 1 wherein said filter media has a generally cylindrical shape with a longitudinal water channel therein for directing water to said bubbler head assembly.

7. An apparatus as claimed in claim 1 wherein said filter media has an exterior surface shaped to provide a water channel between said housing assembly and said filter media.

8. An apparatus as claimed in claim 6 wherein said filter media comprises activated carbon.

9. An apparatus as claimed in claim 7 wherein said filter media comprises activated carbon.

10. An apparatus for adapting an existing water fountain having a water supply line and an existing bubbler head assembly for dispensing water to a filtered water fountain comprising:
- an adapter base configured to be secured to said existing water fountain in place of said existing bubbler head assembly, wherein said adapter base is in fluid communication with said water supply line;
- a housing assembly secured to said adapter base and in fluid communication there with;
- a bubbler head assembly secured to said housing assembly for dispensing water;
- a filter media disposed within said housing assembly and in fluid communication with said adapter base and said bubbler head assembly and;
- a pressure cap removably secured to a top portion of said housing assembly, said pressure cap shaped to engage and secure said filter media.

11. The apparatus of claim 10 wherein said filter media comprises:
- a filtration media having a central water passage therein, said media having an exterior surface in fluid communication with said adapter base, and said central water passage in fluid communication with said bubbler head assembly.

12. The apparatus of claim 11 comprising:
- an end cap having an aperture in fluid communication with said central water passage and said bubbler head assembly.

13. The apparatus of claim 10 wherein said filter media comprises activated carbon.

14. The apparatus of claim 12 wherein said filtration media is cylindrical in shape.

15. The apparatus of claim 13 wherein said filter media is cylindrical in shape.

* * * * *